United States Patent [19]

Terada

[11] 4,054,930
[45] Oct. 18, 1977

[54] CASSETTE-TYPE MAGNETIC TAPE PLAYER

[75] Inventor: Takehiro Terada, Kawanishi, Japan

[73] Assignee: Matsushita Electric Industrial Co., Ltd., Kadoma, Japan

[21] Appl. No.: 607,904

[22] Filed: Aug. 26, 1975

[30] Foreign Application Priority Data

Sept. 6, 1974 Japan .................... 49-107928[U]
Sept. 6, 1974 Japan .................... 49-107929[U]
Sept. 10, 1974 Japan .................... 49-104475

[51] Int. Cl.² .............. G11B 15/16; G11B 15/22; G11B 15/50
[52] U.S. Cl. ........................ 360/96; 360/74; 242/199; 242/189
[58] Field of Search ........... 360/96, 93, 74, 91-92; 242/189-191, 208, 197-200

[56] References Cited

U.S. PATENT DOCUMENTS

| 3,488,058 | 1/1970 | Staar | 360/96 |
| 3,529,787 | 9/1970 | Bowman et al. | 242/189 |
| 3,578,261 | 5/1971 | Yamamoto et al. | 360/96 |
| 3,819,128 | 6/1974 | Hori et al. | 242/189 |
| 3,915,408 | 10/1975 | Ishikawa | 242/191 |
| 3,946,436 | 3/1976 | Takashino | 242/191 |

Primary Examiner—Alfred H. Eddleman
Attorney, Agent, or Firm—Wenderoth, Lind & Ponack

[57] ABSTRACT

A cassette-type magnetic tape player has a take-up reel mount operatively coupled to a motor. The take-up reel mount is provided with an end-of-play detecting mechanism for substantially ejecting a tape container, such as cassette or cartridge, out of the player when a full length of magnetic tape has been wound around a take-up reel within the tape container. A rapid advance mechanism for transferring the magnetic tape onto the take-up reel at a speed higher than that required during normal recording or playback and a guide mechanism for guiding a movable chassis for movement in relation to a stationary chassis are also provided.

9 Claims, 15 Drawing Figures

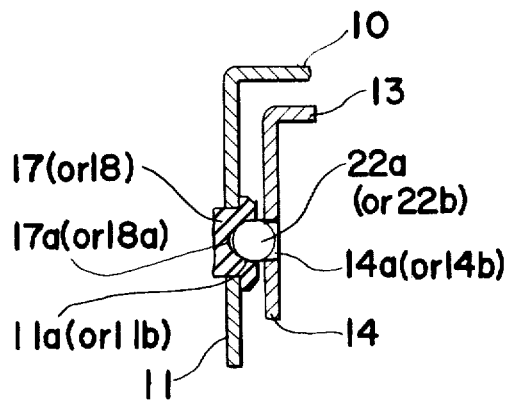
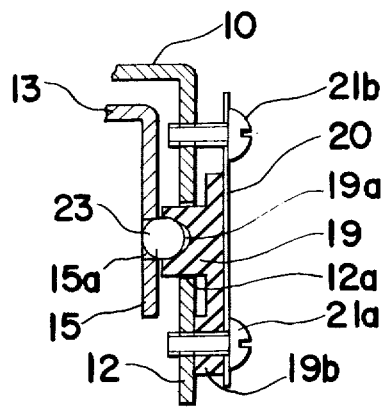
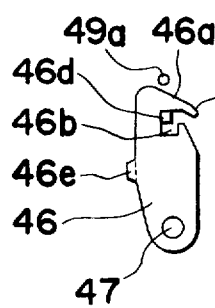
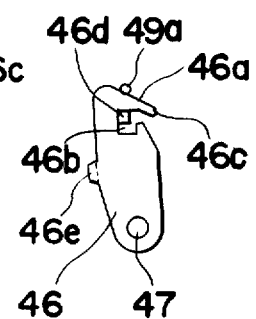
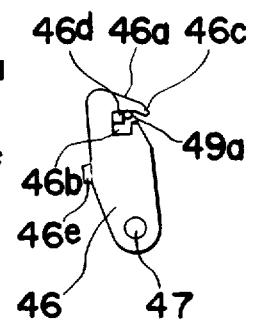
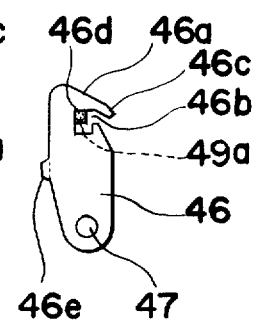
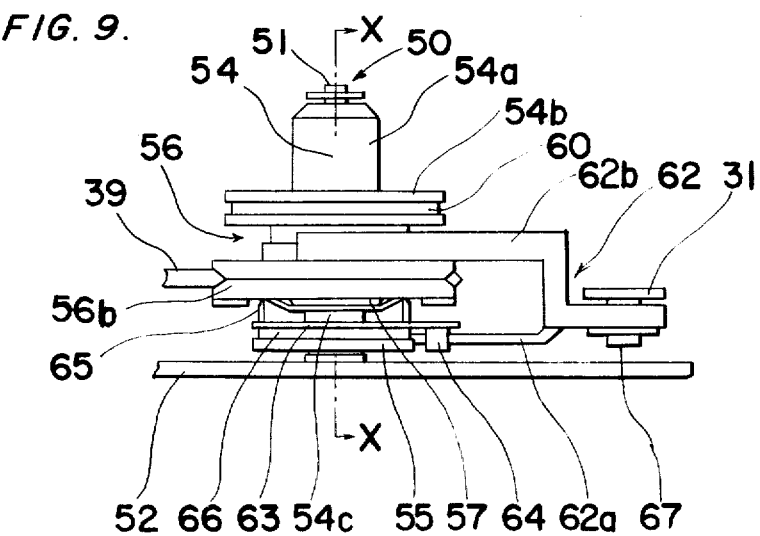

CASSETTE-TYPE MAGNETIC TAPE PLAYER

The present invention generally relates to a magnetic tape player of a type utilizing a self-contained cassette or cartridge in which a magnetic tape is accommodated.

In most cassette-type magnetic tape players now commercially available, an end-of-play detecting mechanism is provided for automatically bring the player into an inoperative condition when substantially the whole length of a magnetic tape is fed from a supply reel onto a take-up reel. The end-of-play detecting mechanisms now available can be classified into three types; one employing an electric system wherein rotation and stoppage of a take-up reel is converted into electric pulses, another one employing a tension arm system wherein variation of the tension of the magnetic tape is detected, and the third employing a separating mechanical system wherein rotation and stoppage of the take-up reel is detected by slip clutch means provided separate from a reel support for supporting the take-up reel.

In the conventional electric system type end-of-play detecting mechanism, various electrical components, such as semiconductors, resistors, capacitors and rotary switches or magnetically operable reed switches are necessary for generating and controlling pulses and one or more solenoid units for giving a switching action are necessary and, therefore, the player tends to become expensive due to the increased manufacturing cost.

In the conventional tension arm system type end-of-play detecting mechanism, it is necessary for a tension arm to be kept in constant frictional contact with the magnetic tape during transportation of said tape and, therefore, the transportation of the magnetic tape can be achieved in a stable manner only with substantial difficulty.

In the conventional separating mechanical system type end-of-play detecting mechanism, it is necessary to operatively connect a detecting element for detecting selective rotation and stoppage of the take-up reel, that is, the reel support, to a member for extracting a switching force for automatic stoppage from a rotary body, such as a flywheel, which continues rotation even when the magnetic tape has substantially completely been transported from the supply reel onto the take-up reel. In order to achieve this, the drive power transmission system tends to be complicated and bulky.

Accordingly, the present invention pertains to a separating mechanical system type end-of-play detecting mechanism which is excellent in terms of the manufacturing cost and also performance as compared with that of any of the other systems and provides a compact, simplified end-of-play detecting mechanism wherein a slip clutch mechanism for detecting selective rotation and stoppage of the reel support and a switching force extracting mechanism for initiating a switching operation are both built into the tape-up reel support.

A slide-in type cassette-type magnetic tape player wherein drive elements, including a capstan and a take-up reel support, are elevated relative to the tape cassette or cartridge in response to insertion of the cassette or cartridge into the player is well known such players being disclosed in U.S. Pat. Nos. 3,385,543 and 3,429,519, respectively patented on May 28, 1968 and Feb. 25, 1969. In the conventional tape player of the tape referred to above, where the magnetic tape is desired to be rapidly transferred from the supply reel onto the take-up reel, it is necessary to first set the player in a normal playback position by the insertion of the tape cartridge and then to set the player in a rapid advance position. Therefore, where the player set in the rapid advance condition and it is desired to bring it to an inoperative position, double-sequenced switching procedures are required so as to first release the player from the rapid advance condition to the normal playback condition and then to switch the player from the normal playback condition to the inoperative condition.

Accordingly, the present invention also pertains to the provision of a cassette-type magnetic tape player wherein switching from the rapid advance condition to the inoperative condition of the player can readily be achieved without the player being conditioned in the playback condition during such switching operation.

Moreover, the present invention pertains to a mounting arrangement by which a movable deck is supported by a stationary deck for movement between inoperative and operative positions so that, during the movement of the movable deck relative to the stationary deck from the inoperative position towards the operative position, drive elements including a capstan and a take-up reel support, all carried by the movable deck, are upwardly elevated in a diagonal direction. For this purpose, the stationary deck and the movable deck are provided with slotted guide means into which corresponding ball elements are operatively engaged for facilitating a smooth movement of the movable deck in relation to the stationary deck. At least one of the slotted guide means is provided with an adjustment member for adjusting the relative position of the movable deck with respect to the stationary deck so that a load, which may otherwise be imposed on the stationary deck from the movable deck during the movement of the latter in relation to the former, can be reduced to facilitate insertion of the cassette or cartridge into the player with a slight pushing force applied thereto and also to avoid any possible unstable movement of the movable deck in relation to the stationary deck.

These and other objects and features of the present invention will become apparent from the following description taken in conjunction with a preferred embodiment thereof with reference to the accompanying drawings, in which:

FIG. 6 is a schematic cross sectional view, taken along the line VI—VI in FIG. 3, showing a portion of a guide mechanism which is located at the left-hand side of the player as viewed in FIG. 1;

FIG. 7 is a schematic cross sectional view, taken along the line VII—VII in FIG. 4, showing the other portion of the guide mechanism which is located at the right-hand side of the player as viewed in FIG. 1;

Figure 1:
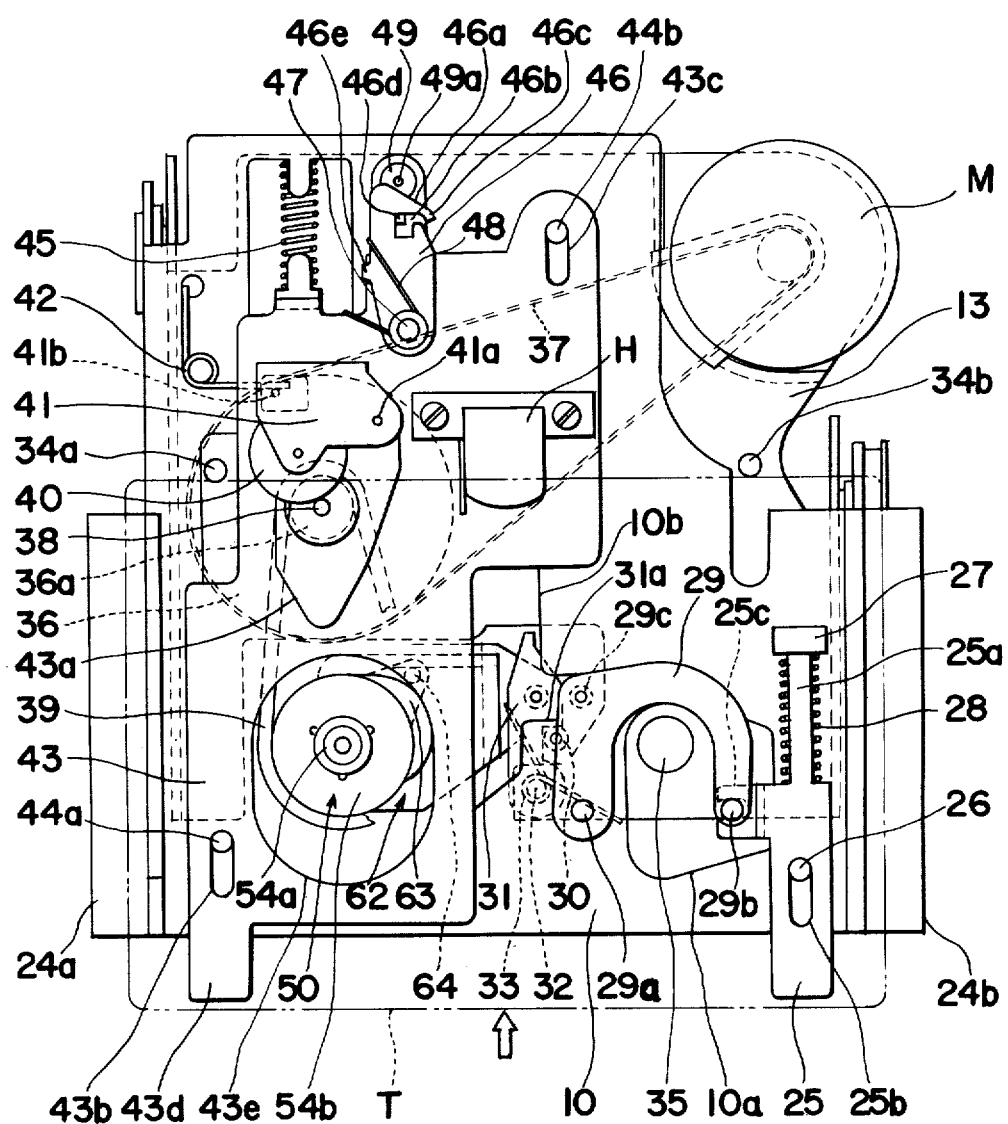
FIG. 1 is a top plan view of a cassette-type magnetic tape player embodying the present invention.
Figure 10:
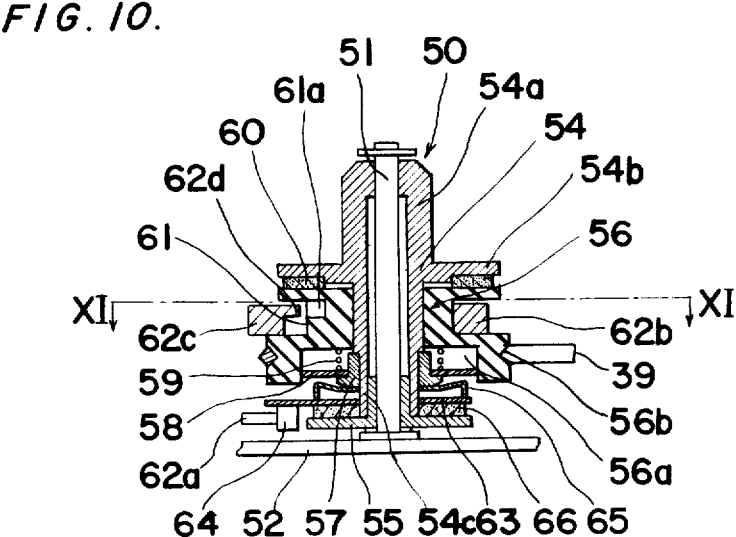
Figure 11:
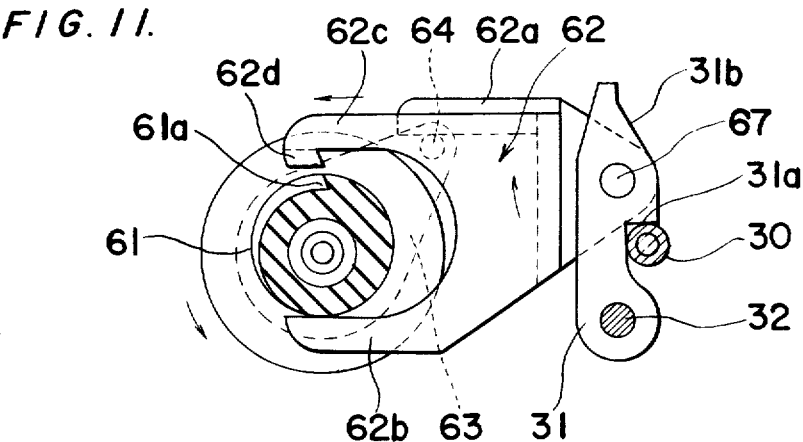
Figure 12:
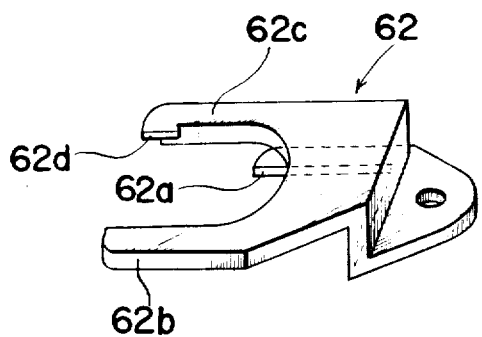

FIGS. 8(a) to (d) illustrate a sequence of steps in the operation of a locking arm constituting a part of a rapid advance mechanism employed in the cassette-type magnetic tape player embodying the present invention;

FIG. 9 is a side view of a take-up reel mount employed in the cassette-type magnetic tape player shown in FIG. 1;

FIG. 10 is a longitudinal sectional view of the take-up reel mount shown in FIG. 9, taken along the line X—X in FIG. 9;

FIG. 11 is a cross sectional view of the take-up reel mount, taken along the line XI—XI in FIG. 10; and FIG. 12 is a perspective view of a switching lever employed in the reel mount shown in any of FIGS. 9 to 11.

Before the description of the present invention proceeds, it is to be noted that like parts are designated by like reference numerals throughout the several views of the accompanying drawings. It is also to be noted that, for the purpose of facilitating an easy and better understanding of the present invention, various components of the cartridge tape player of the present invention will be described under separate headings.

CHASSIS STRUCTURE

Figure 2:
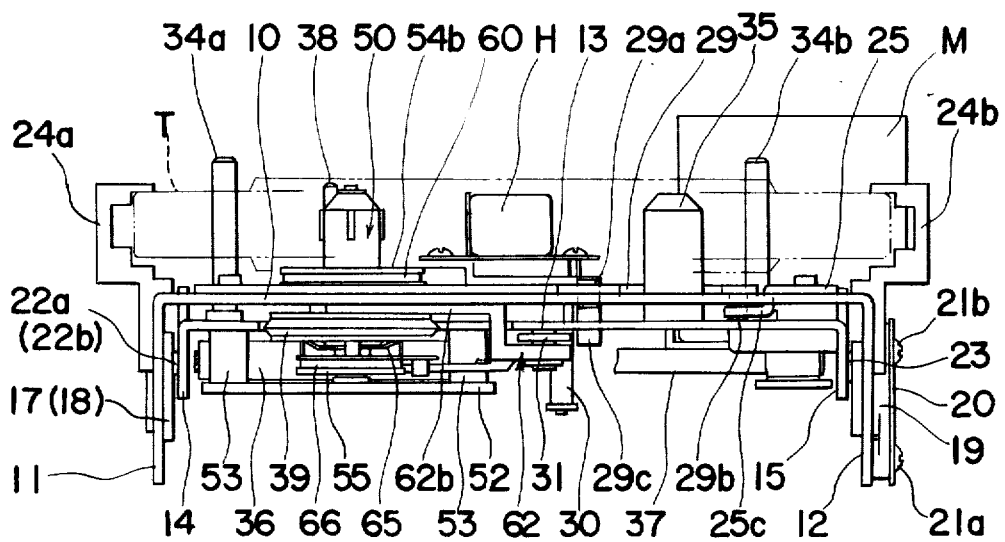
FIG. 2 is a front elevational view of the cassette-type magnetic tape player as shown in FIG. 1.

Referring to FIGS. 1 to 7, the chassis structure of the tape player according to the present invention comprises a stationary deck 10 having a substantially U-shaped section having a pair of opposed skirts 11 and 12 which, as viewed in FIG. 2, extend downwardly from respective side edges of the stationary deck 10. The chassis structure further comprises a movable deck 13 having a pair of opposed skirts 14 and 15, said movable deck 13 being accommodated beneath the stationary deck 10 with said skirts 14 and 15 extending in parallel relation to the respective skirts 11 and 12 of the stationary deck 10, it being understood that, as viewed in FIG. 2, the height of each of the skirts 11 and 12 is substantially double the height of the skirts 14 and 15.

As will be described in detail, the movable deck 13 is supported in position beneath the stationary deck 10 for movement between inoperative and operative positions and is normally biased to the inoperative position by means of a spring element 16, for example, a compression spring shown in FIG. 5, disposed between respective rear ends of the stationary and movable decks 10 and 13. It is to be noted that, during the movement of the movable deck 13, effected in a manner as will be described later, between the inoperative and operative positions, the plane of said movable deck 13 moves close to and away from the plane of the stationary deck 10. For this purpose, a guide arrangement is employed which will now be described.

As best shown in FIGS. 3 to 7, the skirt 11 of the stationary deck 10 has formed therein at least two slots 11a and 11b both extending in a direction diagonal to the plane of the stationary deck 10 while the skirt 12 of the stationary deck 10 has formed therein at least one slot 12a oriented in the same direction as the slots 11a and 11b.

Within the slots 11a and 11b, as best shown in FIG. 6, plastic seat members 17 and 18, made of synthetic resin and having elongated recesses 17a and 18a similar in shape to the slots 17 and 18, respectively, are firmly inserted therein the recesses 17a and 18a facing the adjacent skirt 14 of the movable deck 13.

A similar seat member 19, having one surface with an elongated recess 19a therein and the opposite surface integrally formed with a spacer 19b extending therefrom at substantially right angles to the direction of extension of the elongated recess 19a or the slot 12a, is held in position within the slot 12a in the skirt 12 of the stationary deck 10 with the elongated recess 19a facing the adjacent skirt 15 of the movable deck 13. A substantially rhomboidal mounting plate 20 is mounted on the skirt 12 of the stationary deck 10 by means of a pair of spaced set screws 21a and 21b both tapped into said skirt 12. It is to be noted that only one of the set screws 21a extends through the spacer 19b of the seat member 19 so that, by turning the other of the set screws 21b, the position of the elongated recess 19a relative to the plane of the skirt 12 can be adjusted for a purpose which will be described later.

The skirts 14 and 15 of the movable deck 13 are also provided with a pair of spaced slots 14a and 14b and a slot 15a, respectively. Between the elongated recesses 17a and 18a and the slots 14a and 14b and between the elongated recess 19a and the slot 15a, there are provided a pair of balls 22a and 22b and a ball 23, respectively, each of said balls 22a, 22b and 23 having a diameter greater than the width of any of said recesses 17a, 18a and 19a and slots 14a, 14b and 15a so that the movable deck 13 can be operatively carried by the stationary deck 10 through these balls 22a, 22b and 23.

Figure 3:
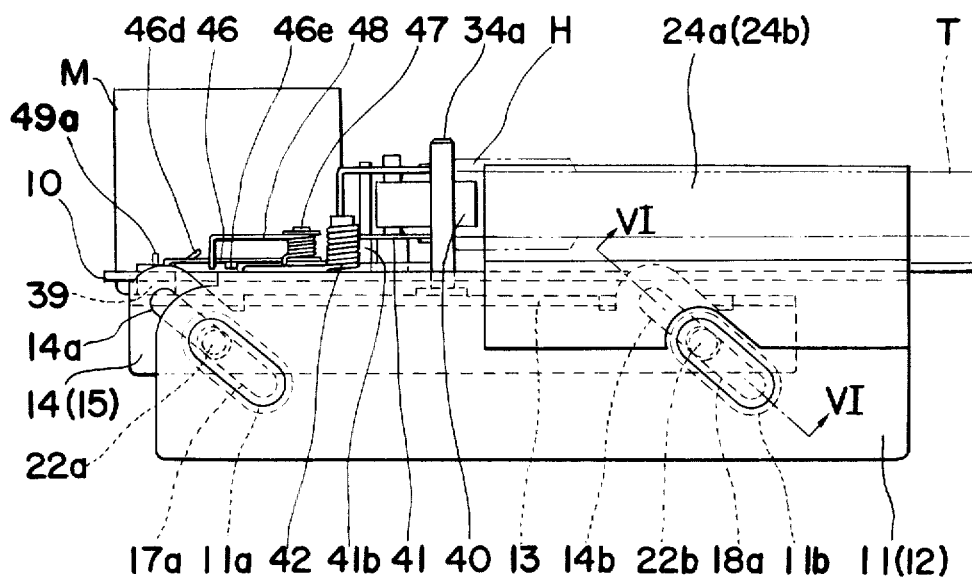
FIGS. 3 and 4 are left-hand and right-hand side views of the cassette-type magnetic tape player shown in FIG. 1.
Figure 4:
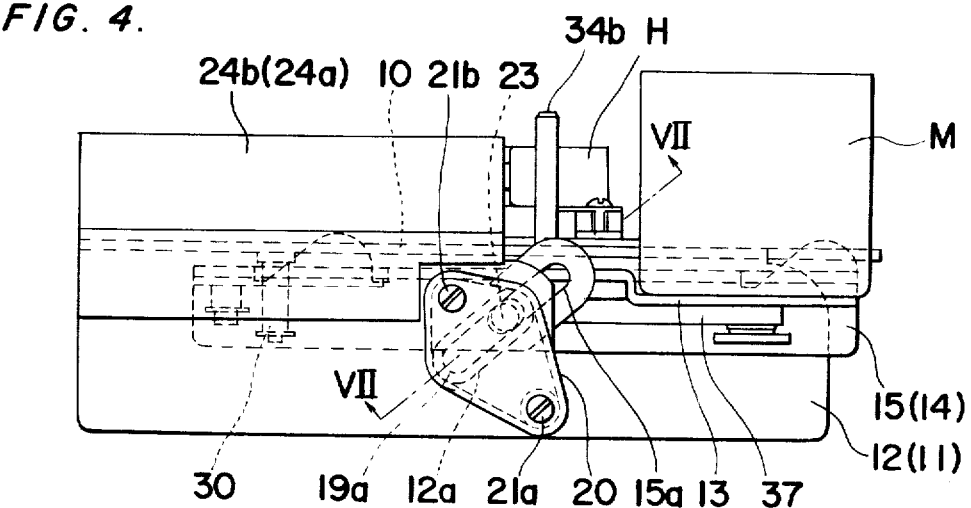

The elongated recesses 17a, and 18a and 19a and the slots 14a, 14b and 15a are all diagonally oriented in the same direction so that, when the movable deck 13 is moved, for example, from the inoperative position towards the operative position against the biasing force of the spring element 16, the movable deck 13 being moved approaches the stationary deck 10 thereby attaining a minimum spacing between said deck 10 and said deck 13. This condition is illustrated in FIGS. 2 to 4. During this movement of the movable deck 13, the balls 22a, 22b and 23 roll while remaining sandwiched between the skirts 11 and 14 and between the skirts 12 and 15, respectively.

While the movable deck 13 is supported in position relative to the stationary deck 10 in the manner as hereinbefore described, adjustment of the set screw 21b selectively applies and relieves a pushing force which is transmitted from the seat member 19 to the skirt 15 through the ball 23. Specifically, if the set screw 21b is turned in such a direction as to cause at least a portion of the mounting plate 20 adjacent said set screw 21b to displace towards the skirt 12, the pushing force increases to avoid any possible unstable and shaking movement of the movable deck 13 relative to the stationary deck 10.

Moreover, the movement of the movable deck 13 relative to the stationary deck 10 is accompanied by rolling of the balls 22a, 22b and 23, so that the movable deck 13 can readily and smoothly be diagonally upwardly moved in the direction from the inoperative position to the operative position.

The stationary deck 10 carries a pair of opposed guide rails 24a and 24b rigidly mounted on said deck 10 at the respective sides thereof and substantially above the skirts 11 and 12 for support of a tape cartridge T shown by the broken line in FIGS. 1 to 3. These guide rails 24a and 24b extend from the front edge of the stationary deck 10 towards the rear edge thereof and are spaced from each other a distance corresponding to the width of the tape cartridge T. When the tape cartridge T is inserted in a direction as indicated by the arrow in FIG. 1, opposed side portions of the tape cartridge T are respectively received in and guided by the guide rails 24a and 24b as can be understood from FIG. 2.

The movable deck 13 carries a pair of follower rods 34a and 34b situated on respective sides of the magnetic recording and/or reproducing transducer head H, each of said rods 34a and 34b having one end rigidly connected to said deck 13 and the other end terminating above the stationary deck. Specifically, these rods 34a and 34b extend from the movable deck 13 at right angles thereto and terminate in position ready to contact the front of the tape cartridge T so that, as the tape cartridge T is inserted, the front of said tape cartridge T can abut against said rods 34a and 34b. Continued application of pushing force to said tape cartridge T in an attempt to insert the cartridge T into the player, which pushing force is in turn transmitted to the movable deck 13 through the engagement of the front of the tape cartridge T with the rods 34a and 34b, results in movement of the movable deck 13 from the inoperative position to the operative position against the force of the spring element 16. It is to be noted that, during the movement of the movable deck 13 from the inoperative position towards the operative position, the rods 34a and 34b are lifted upwardly in sliding contact with the front of the tape cartridge T being inserted. At the time of completion of the movement of the movable deck 13 from the inoperative position to the operative position effected in the manner as hereinbefore fully described, the movable deck 13 is locked in position as will subsequently be described later and, on the other hand, the transducer head H partially projects into the front opening in the tape cartridge in readiness for recording or playback operation.

EJECTING AND LOCKING MECHANISM

The ejecting and locking mechanism is intended to operate in such a manner that when the tape cartridge T is inserted in position above the stationary deck 10 with one of the sound tracks on magnetic tape within the cartridge T operatively aligned with a recording and/or reproducing transducer head H, the movable deck 13 is locked in the operative position after having been moved from the inoperative position in response to insertion of the tape cartridge T, and also in such a manner that when the tape cartridge is desired to be ejected out of the player during playback of the tape or after the playback has been completed, the movable deck 13 which has been held in the operative position can be automatically returned to the inoperative position by the action of the spring element 16.

Figure 5:
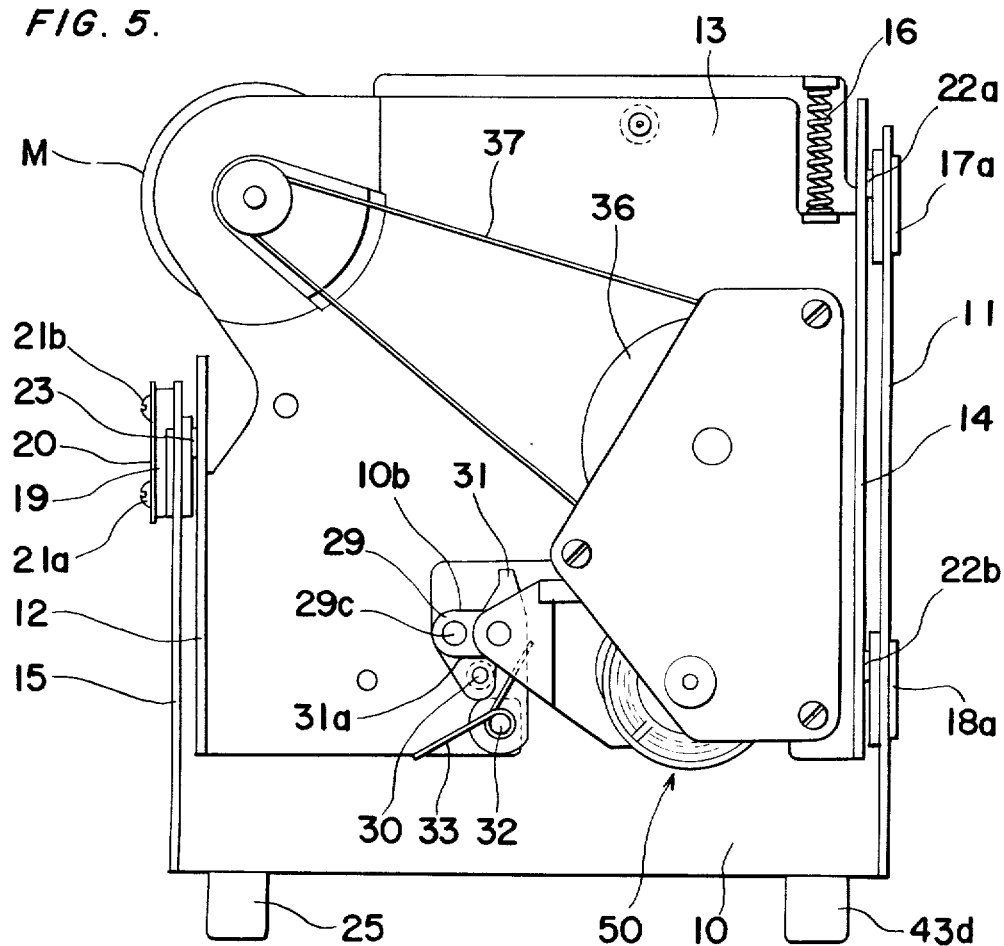
FIG. 5 is a bottom plan view of the cassette-type magnetic tape player shown in FIG. 1.

This ejecting and locking mechanism comprises, as shown in FIGS. 1, 2 and 5, an ejecting lever 25 having one end accessible to the hand of an operator of the player and the other end with an integral extension 25a thereon. This ejecting lever 25 is slidably supported above the stationary deck 10 for movement between extended and retracted positions by means of a guide pin 26, which extends from the stationary deck 10 through a slot 25b formed in the ejecting lever 25, and a bored guide piece 27 rigidly mounted on the stationary deck 10. Said ejecting lever 25 is normally biased to the extended position by a spring element 28 mounted around the lever extension 25a and between the guide piece 27 and the body of the lever 25 and can be moved from the extended position to the retracted position against the spring element 28 by the application of finger pressure thereto. During this movement of the ejecting lever 25 towards the retracted position, a free end portion of the lever extension 25a slidably extends through the bore (not shown) in the guide piece 27 while the slot 25b moves relative to the pin 26.

A substantially U-shaped intermediate lever 29, having one end rotatably mounted on the stationary deck 10 by means of a mounting pin 29a and the other end rigidly connected with an engagement pin 29b extending downwardly therefrom through an opening 10a in the stationary deck 10, is mounted on the stationary deck 10 with said engagement pin 29b loosely engaged in a forked portion 25c, said forked portion 25c being integral with the laterally outwardly extending from the ejecting lever 25 and terminating substantially below said other end of said intermediate lever 29. It will readily be seen that the movement of the ejecting lever 25 from the extended position towards the retracted position produces counterclockwise rotation of the intermediate lever 29 about the mounting pin 29a viewed in FIG. 1.

The U-shaped intermediate lever 29 carries a rejecting pin 29c extending downwardly therefrom through an opening 10b in the stationary deck 10 and terminating adjacent the movable deck 13 beneath said stationary deck 10. It is to be noted that the minimum length of the rejecting pin 29c should be such that, when the movable deck 13 is in the operative position, said rejecting pin 29c extending through the stationary deck 10 further extends through the movable deck 13 and terminates at a point spaced a certain distance from the undersurface of the movable deck 13 as viewed in FIG. 2.

The ejecting and locking mechanism further comprises a lock pin 30 which, as viewed in FIG. 2, extends downwardly extends through both of the decks 10 and 13 from the stationary deck 10 parallel to the ejecting pin 29c. Operatively associated with said lock pin 30 is a lock arm 31 pivotally carried by the movable deck 13 by a mounting pin 32 for movement between disengaged and engaged positions about said pin 32, said lock arm 31 having a hook portion 31a therein for selective engagement with and disengagement from said lock pin 30 in accordance with angular movement of said lock arm 31 between said engaged and disengaged positions. This lock arm 31 is normally biased to the engaged position by the action of a spring element 33, for example, a wire spring, with the tip of said lock arm being held in contact with the lock pin 30 so long as the movable deck 13 is in the inoperative position. The shape of the lock arm 31 is best shown in FIGS. 5 and 10.

In the construction thus far described, and if it be assumed that the various components thus far described are positioned as shown in FIGS. 1 to 5, it is clear that movement of the ejecting lever 25 from the extended position towards the retracted position against the spring element 28 by the application of finger pressure causes the intermediate lever 29 to rotate counterclockwise with the rejecting pin 29c engaging to the lock arm 31. Continued counterclockwise rotation of the intermediate lever 29 with the pin 29c in contact with the lock arm 31 causes the lock arm 31 to pivot about the pin 32 against the spring element 33 so that the hook portion 31a of the lock arm 31, into which the lock pin 30 has been engaged to lock the movable deck 13 in the operative position as shown, can be disengaged from said lock pin 30 thereby permitting the movable deck 13 to return from the operative position to the inoperative position by the action of the spring element 16.

On the contrary thereto, when the movable deck 13 is to be moved from the inoperative position towards the operative position by the insertion of the tape cartridge T in the manner as hereinbefore described, the lock pin 30, which has been held in contact with the tip of the lock arm 31 as hereinbefore described, slides in contact with and relative to a portion 31b (FIG. 10) of the lock arm 31 causing the latter to pivot against the spring element 33 about the pin 32. At the time of completion of the insertion of the tape cartridge T, that is, completion of the movement of the movable deck 13 from the inoperative position to the operative position, the lock arm 31, which has been pivoted against the spring pin 33 in the manner as hereinbefore described in contact with the lock pin 30, pivots by the action of the spring element 33 towards the lock pin 30 with the consequent engagement of the lock pin 30 into the hook portion 31a of the lock arm 31. In this way, the movable deck 13 can be locked in the operative position.

TAPE DRIVE SYSTEM

As is well known to those skilled in the art, the magnetic tape with which the tape player according to the present invention is operated is generally referred to as cassette magnetic tape. The commercially available cassette magnetic tape comprises a cartridge or container having a pair of spaced rotatable reels, and a magnetic tape housed within the cartridge and having both ends secured to the respective reels.

Since the concept of the present invention can equally be applicable to a tape player utilizing a commercially available cartridge tape of a type comprising a container having a single reel and a substantially endless magnetic tape wound around the single reel, the term "cartridge" is employed in a broad sense to include both a cassette for the cassette magnetic tape and a cartridge for cartridge magnetic tape both currently referred to in the commercial market. It is to be noted that the cassette magnetic tape has a width smaller than the width of the cartridge magnetic tape as commercially standardized.

The drive system herein disclosed includes a take-up reel mount, generally indicated by 50, carried by the movable deck 13 in a manner as will be described later and operatively coupled to a drive motor M in a manner as will be described later, and a stationary hub 35 spaced from the axis of rotation of the take-up reel mount 50 a distance corresponding to the distance between the reels (not shown) within the tape cartridge T, said hub 35 having one end rigidly mounted on the movable deck 13 while the other end of said hub 35 extends through the opening 10a in the stationary deck 10 and terminates above the stationary deck 10 as viewed in FIG. 2.

The motor M, which may be energized in response to completion of insertion of the cartridge tape T, that is, completion of the movement of the movable deck 13 to the operative position, is drivingly coupled by an endless belt 37 to a flywheel 36 which is rotatably supported by and, as viewed in FIG. 2, beneath the movable deck 13 and which is coaxially connected with a capstan 38 for rotation together with said flywheel 36. The capstan 38 extends, as viewed in FIG. 2, upwardly through the opening 10b in the stationary deck 10 and then an opening 43a, formed in a slide plate 43, the function of which slide plate 43 will be described later. This capstan 38 is adapted to enter a perforation in the tape cartridge T so as to be positioned behind 7 the tape when the cartridge T is inserted and the movable deck 13 is consequently moved to the operative position, the purpose of which will subsequently be described.

The flywheel 36 has mounted thereon a pulley 36a situated between it and the capstan 38 for rotation together with said flywheel 36, said pulley 36a being drivingly coupled to the take-up reel mount 50 by means of an endless belt 39.

Operatively associated with the capstan 38 is a pinch roller 40 rotatably carried by a roller carriage 41. The roller carriage 41 is pivotally mounted on the deck 10 for selective pivotal movement between engaged and disengaged positions by means of a mounting shaft 41a which extends from the stationary deck 10 through the opening 43a in the slide plate 43. The roller carriage 41 thus supported is normally biased in one direction about the shaft 41a to the engaged position by the action of a spring element 42. The pinch roller 40 with the roller carriage 41 normally held in the engaged position contacts the capstan 38, when the movable deck 13 is in the operative position, through the tape sandwiched between it and said capstan 38 for driving the tape in one direction at a predetermined speed.

Assuming that the tape cartridge T has been completely inserted and the movable deck 13 has consequently been moved to the operative position as shown, a rotational force exerted by the energized motor M is transmitted both to the capstan 38 and to the take-up reel mount 50 whereby the tape within the cartridge is fed from one of the reels, which is aligned with and mounted on the hub 35 and is hereinafter referred to as the supply reel, to the other of the reels which is aligned with and mounted on the reel mount 50 and is hereinafter referred to as the take-up reel. As is well understood by those skilled in the art, although the reel mount 50 causes the take-up reel to wind up the tape within the cartridge, the speed of transfer of the tape from the supply reel onto the take-up reel is regulated by the capstan 38 with which the pinch roller 40 on the roller carriage 41 held in the engaged position biased by the spring element 42 contacts under pressure with said tape sandwiched between said capstan 38 and said pinch roller 40.

In the case where the tape cartridge T is desired to be ejected out of the player during the recording or playback operation, it is necessary to apply finger pressure to the ejecting lever 25 and it will readily be seen that the lock arm 31 disengages from the lock pin 30 in the manner as hereinbefore described and, therefore, the movable deck 13 commences to return from the operative position towards the inoperative position because of being biased by the spring element 16, deenergizing the motor M. During this movement of the movable deck 13 towards the inoperative position, the rods 34a and 34b, hub 35, capstan 38, reel mount 50 and motor M, all carried by the movable deck 13, are, as viewed in FIG. 2, simultaneously moved downwardly in relation to the stationary deck 10 in readiness for removal of the cartridge tape T from the player.

RAPID ADVANCE MECHANISM

The slide plate 43 having the opening 43a formed therein as hereinbefore described is slidably supported on the stationary deck 10 by means of a plurality of pins 44a and 44b, which extend from the stationary deck 10 through respective slots 43b and 43c formed in said plate 43, for movement between inoperative and operative positions. This slide plate 43 is normally biased in the direction toward the inoperative position by the action of a spring element 45 and has thereon a projection 43d accessible to the hand of the operator for receiving finger pressure to be applied thereto for moving the slide plate 43 from the inoperative position towards the operative position against the action of the spring element 45.

The transducer head H is rigidly mounted on this slide plate 43 and is held in position ready to partially enter the front opening of the tape cartridge T to align with the tape within the cartridge so long as the slide plate 43 is held in the inoperative position. The slide plate 43 also has an opening 43e through which a portion of the reel mount 50 projects outwardly.

Pivotally carried by the slide plate rearwardly of the transducer head H is a push-push type hysteretic locking arm 46 having one end pivotally connected to the slide plate 43 by means of a mounting pin 47 and having at the other end an inclined edge 46a. With particular reference to FIGS. 1 and 8(a) to (d), the locking arm 46 also has a cut-out portion 46b, which defines a finger portion 46c having thereon the inclined edge 46a on said slide plate 46, and an inclined projection 46d which protrudes outwardly from the plane of said slide plate 46 at an angle to the plane of the slide plate 46 (see FIG. 3). This locking arm 46 is pivotable between rest and pivoted positions and is normally biased, for example, clockwise as viewed in FIGS. 1 and 8, to the rest position by the action of a resilient element 48. The rest position of the locking arm is defined by an edge of the slide plate 43 with which a stop 46e integral with said locking arm 46 is engaged.

Operatively associated with said locking arm 46 is a stud 49 having one end rigidly mounted on the movable deck 13 and the other end of which has an integrally formed projection 49a thereon which is smaller in diameter than the diameter of the stud 49 and has a diameter sufficient to allow the projection 49a to enter the cut-out portion 46b in the locking arm 46 in a manner as will subsequently be described.

With reference to FIGS. 8(a) to (d) showing a sequence of operation of the locking arm 46, as long as the movable deck 13 is held in the operative position and when the pushing force is applied to the projection 43d so as to move the slide plate 43 from the inoperative position towards the operative position against the action of the spring element 45, the inclined edge 46a of the locking arm 46 abuts against the projection 49a. It is to be noted that since the transducer head H is rigidly carried by the slide plate 43, movement of the slide plate 43 from the inoperative position towards the operative position results in separation of the transducer head H from the alignment with the tape within the cartridge T. Simultaneously therewith, the roller carriage 41, having an engagement pin 41b secured thereto and extending into and engagement hole (not shown) in the slide plate 43, is pivoted against the action of the spring element 42 about the shaft 41a with the pinch roller 40 disengaging from the capstan 38 as the pushing force applied to the plate 43 through the projection 43d is in turn applied to the roller carriage 41 through the engagement between the engagement pin 41b and said engagement hole in said slide plate 43.

During continued application of the pushing force so as to move the slide plate 43 towards the operative position, as shown in FIG. 8(b), the projection 49a carried by the movable deck 13 in the operative position through the stud 49 slides relative to and in contact with the inclined edge 46a while the locking arm 46 is forced to pivot counterclockwise about the pin 47 against the action of the spring element 48, and is finally hooked in position by the finger portion 46c as substantially shown in FIG. 8(c).

So long as the finger portion 46c is engaged with the projection 49a in the manner as shown in FIG. 8(c), the slide plate 43 is held in the operative position in which condition both the pinch roller 40 and the transducer head H are held in position clear of the tape within the tape cartridge T. Therefore, the tape within the cartridge T can be wound from the supply reel onto the take-up reel at a higher speed than that when the tape is sandwiched under pressure between the pinch roller 40 and the capstan 38. This is possible because of the particular construction of the take-up reel mount 50 which will subsequently be described with reference to FIGS. 9 to 11.

If the ejecting lever 25 is moved to the retracted position while the slide plate 43 is locked in the operative position with the finger portion 46c of the locking arm 46 engaged with the projection 49a, the movable deck 13 moves towards the inoperative position from the operative position with the projection 49a disengaging from the cut-out portion 46b in the locking arm 46, thereby causing the slide plate 43 to return to the inoperative position under the bias of the spring element 45.

On the other hand, if a pushing force is again applied to the projection 43d while the slide plate 43 is locked in the operative position in the manner as hereinbefore described, the inclined projection 46d of the locking arm 46 being urged clockwise about the pin 47 by the action of the spring element 48 is, as substantially shown in FIG. 8(d), brought into position immediately above and in contact with the tip of the projection 49a and, upon subsequent removal of the pushing force which has again been applied to the slide plate 43 through the projection 43d, the projection 49a slides down the inclined projection 46d disengaging from the locking arm 46. As a result thereof, the slide plate 43 is biased to the inoperative position from the operative position by the action of the spring element 45 with the pinch roller 40 and head H being brought into position to engage the tape within the tape cartridge T.

From the foregoing, it is clear that the rapid advance mechanism of the construction hereinbefore described is designed such that, when the slide plate 43 is locked in the operative position by the engagement between the locking arm 46 and the projection 49a of the stud 49 on the movable deck 13, the tape within the tape cartridge T is allowed to be transported from the supply reel onto the tape-up reel solely by the rotation of the reel mount 50.

END-OF-PLAY DETECTOR

An end-of-play detector, that is, an instrument for automatically returning the movable deck 13 from the operative position to the inoperative position when recording or playback is completed with a substantially full length of tape wound up by the take-up reel within the cartridge or when a substantially full length of tape is rapidly transferred from the supply reel onto the take-up reel with the slide plate 43 locked in the operative position, is built into the take-up reel mount 50 according to the present invention. Therefore, the structure of the take-up reel mount 50 will first be described with particular reference to FIGS. 9 to 11.

The take-up reel mount 50 comprises a spindle 51 having one end rigidly mounted on a base plate 52 supported, as seen in FIG. 2, below the movable deck 13 in spaced relation to said movable deck 13 by means of a plurality of spacers 53, said base plate 52 also being used to support the flywheel 36 between the movable deck 13 and said base plate 52.

Onto this spindle 51, a sleeve 54, having one end portion in the shape of a splined hub portion 54a and the other end having a mounting disc 55 thereon which is pressure-fitted thereto, is rotatably mounted. A substantially intermediate portion of the sleeve 54 has integrally formed thereon a radially outwardly extending annular seat 54b and a portion of the sleeve 54 adjacent the mounting disc 55 is radially inwardly stepped to provide a reduced diameter portion 54c.

A cylindrical block 56 having a construction which will subsequently be described is rotatably mounted on the sleeve 54 and held in position, in a manner which will be described later, between the annular seat 54b and the reduced diameter portion 54c. The cylindrical block 56 has one end face axially inwardly recessed to provide a spring chamber 56a and an outer peripheral portion radially inwardly grooved to provide a pulley 56b around which the endless belt 39 is mounted.

Mounted on the reduced diameter portion 54c is a flanged boss member 57 pressure fitted thereto for backing up an annular closure member 58 which closes the spring chamber 56a with a compression spring 59 housed within said spring chamber 56a. An annular friction pad 60, made of, for example, felt cloth, is mounted between the annular seat 54b and the other end face of the cylindrical block 56 whereby the rotational force transmitted to said cylindrical block 56 by means of the endless belt 39 can be transmitted to the sleeve 54 through the friction pad 60 because the cylindrical block 56 is biased towards the annular seat 54b by the action of the compression spring 59.

The take-up reel mount 50 having the construction thus far described is satisfactorily operable if the end-of-play detector mechanism is not desired in the tape player.

The end-of-play detector mechanism employed in the present invention and subsequently described is a mechanical one and does not require any electrical component such as a switch arrangement and a solenoid unit, both of which are required in the conventional player of a similar kind.

The end-of-play detector mechanism comprises an eccentric body 61, formed as a part the cylindrical body 56 and designed as will be described in detail later, and a switching lever 62 having a shape as best shown in FIGS. 11 and 12.

The end-of-play detector mechanism further comprises a biasing lever 63 having a substantially teardrop-like shape as best shown by the dotted line in FIG. 11, which biasing lever 63 has one end loosely mounted on the reduced diameter portion 54c of the sleeve 54 and between the flanged boss member 57 and the mounting disc 55 and at the other end has rigidly mounted thereon a stop pin 64. Provided between the flange of the flanged boss member 57 and said biasing lever 63 and between said biasing lever 63 and the mounting disc 55 are a thrust washer 65 and an annular friction pad 66 similar to the friction pad 60, respectively, said thrust washer 65 applying an axial pushing force to said biasing lever 63 so that the rotational force of the sleeve 54 can be transmitted to said lever 63 substantially only through the friction pad 66.

The switching lever 62 has one end pivotally connected to the lock arm 31 by means of a connecting pin 67 and the other end in the shape of an abutment 62a with which the stop pin 64 on the biasing lever 63 is engageable in manner which will be described later. This switching lever 62 has integrally formed thereon a feeler 62b and a restricting arm 62c, said feeler 62b and restricting arm 62c lying in the same plane with respect to each other and in offset relation to the plane of the abutment 62a. At the tip of the restricting arm 62c in the switching lever 62, there is formed an engagement 62d protruding towards the feeler 62b and having a thickness smaller than, for example, a half of the thickness of the restricting arm 62c.

This switching lever 62 having the construction as hereinbefore described is positioned in such a manner that the cam body 61 is accommodated within a space between the feeler 62b and the restricting arm 62c while the abutment 62a is situated on the path of travel of the stop pin 64 substantially as shown in FIG. 10.

The take-up reel mount 50 operates in the following manner. As long as the rotational force is transmitted from the motor M to the pulley 56b via the flywheel 36 to wind the tape within the cartridge T from the supply reel, then mounted on the stationary hub 15, onto the take-up reel then mounted on the splined hub portion 54a, the rotational force thus transmitted is in turn transmitted to the sleeve 54 through the friction pad 60 and then to the biasing lever 63 through the friction pad 66 via the mounting disc 55 rotatable together with said sleeve 54. Therefore, the stop pin 64 is held in contact with the abutment 62a as shown in FIG. 11.

During the time the parts are in these positions, the feeler 62b of the switching lever 62 is held in contact with the eccentric cam body 61 with the switching lever 62 undergoing a rocking motion about the connecting pin 67. It is to be noted that, even though the switching lever 62 undergoes the rocking motion, no movement of the switching lever 62 is transmitted to the locking arm 31. It is also to be noted that, since the biasing lever 63 applies a biasing force to the abutment 62a through the stop pin 64, no engagement between the engagement 62d and a recess, said recess being formed at 61a in the eccentric cam body 61 for engagement with said engagement 62d, takes place during the rocking motion of the switching lever 62.

At the time of completion of wind-up of the tape onto the take-up reel, the take-up reel and, therefore, the sleeve 54 comes to a standstill and undergoes a slip motion relative to the cylindrical body 56 which is still and continuously rotated by the rotational force transmitted to the pulley 56b through the endless belt 39 so long as the motor M is energized. Simultaneously therewith, the rotational force, which has been applied to the sleeve 54 through the friction pad 60, is no longer applied to the biasing lever 63. Accordingly, during further rocking motion of the switching lever 62, the abutment 62a pushes the stop pin 64 in a direction opposite to said abutment 62a, that is, clockwise about the axis of the spindle 51 as viewed in FIG. 11 in accordance with the eccentric rotation of the cam body 61 and, therefore, the engagement 62d is subsequently engaged in the recess 61a. It is to be noted that the recess 61a is so sized as to accommodate therein only the engagement 62d.

Upon engagement of the engagement 62d into the recess 61a, the switching lever 62a is pulled to the left in FIG. 11 by the continued rotation of the cam body 61 and, therefore, by the cylindrical block 56 so that the lock arm 31 is pivoted about the pin 32 to the disengaged position against the action of the spring element 33 (FIGS. 1 and 5). Therefore, the movable deck 13 is allowed to return to the inoperative position because the lock pin 30 is disengaged from the hook portion 31a in the lock arm 31 which has been pivoted to the disengaged position in the manner as hereinbefore described.

Further rotation of the cam body 61 and, therefore, the cylindrical block 56, causes the engagement 62d to disengage from the recess 61a and, as a result thereof, the switching lever 62 is returned to the original position together with the lock arm 31 by the action of the spring element 33 acting on the lock arm 31. Shortly after the disengagement of the lock pin 30 from the hook portion 31a in the lock arm 31 has taken place, the motor M is deenergized and, therefore, the take-up reel mount 50 ceases to rotate.

The take-up reel mount 50 having the construction as hereinbefore described can be used in any of ordinary cassette-type magnetic tape player of any kind as well as to that which has been described above.

From the foregoing full description of the present invention, it has now become clear that, in order to bring the player from the rapid advance position, in which condition the magnetic tape within the cartridge T is rapidly transferred from the supply reel onto the take-up reel, to the inoperative position in which condition the movable deck is returned to the inoperative position with the motor M deenergized, the player need not be brought to the playback position.

It is also clear that, because of the particular construction of the guide mechanism for the movable deck supported for movement in relation to the stationary deck, the movable deck can be stably supported with no substantial fluttering occurring during the movement thereof even if vibrations and/or shocks are applied to the player of the present invention and, therefore, the transducer head and the tape within the tape cartridge can be exactly aligned with each other.

Moreover, it is clear that, because of the particular construction of the take-up reel mount, no separate detecting element which may otherwise be required in the conventional player of a similar kind, is required and, therefore, the player according to the present invention can be manufactured with a substantial reduction in the manufacturing cost and also in size.

Although the present invention has been fully described in conjunction with the preferred embodiment thereof, it should be noted that various changes and modifications will be apparent to those skilled in the art without departing from the true scope of the present invention. By way of example, the various spring elements, such as designated by 16, 20, 42, 45 and 48 in the foregoing description, may be in the form of a tension spring, a leaf spring, or a wire spring.

Therefore, such changes and modifications are to be understood as included within the true scope of the present invention unless they depart therefrom.

What is claimed is:

1. A magnetic tape player for use with a self-contained tape container, such as a cassette or cartridge, accommodating therein a reeled magnetic tape, which comprises in combination:
    a stationary chassis having guide means for defining a passage through which said container is inserted into the player;
    a movable chassis carrying projection means rigidly mounted thereon, a capstan rotatably mounted thereon and a drive motor operatively coupled to said capstan for rotating said capstan in one direction when said drive motor is energized;
    guide means for mounting said movable chassis on said stationary chassis for enabling said movable chassis to move between inoperative and operative positions in a direction substantially parallel to the direction of insertion of said container, the plane of said movable chassis during movement thereof between said inoperative and operative positions shifting close to and away from the plane of said stationary chassis, said movement of said movable chassis being effected in response to the insertion of said container into the player with the front of said container engaging to said projection means to cause said movable chassis to be moved from said inoperative position towards said operative position;
    a pinch roller carriage pivotally mounted on the stationary chassis for pivotal movement between engaged and disengaged positions and normally biased to said engaged position, said pinch roller carriage including a pinch roller rotatably carried thereby, said capstan when said movable chassis is moved to said operative position penetrating into an opening in said container and cooperating with said pinch roller to sandwich the magnetic tape within said container between it and said pinch roller for driving said magnetic tape in one direction;
    a slidable plate slidably mounted on said stationary chassis for movement between inoperative and operative positions and normally biased to said inoperative position, said slidable plate having rigidly mounted thereon a transducer head which, when said slidable plate is held in said inoperative position, aligns with the magnetic tape within the container in readiness for recording or playback of sound information to be recorded or recorded on said magnetic tape, said transducer head separating from said magnetic tape when said slidable plate is moved towards said inoperative position by the application of finger pressure thereto;
    means for locking said movable chassis in said operative position after said movable chassis has been moved to said operative position in response to the insertion of said container through said passage on said stationary chassis;
    means for locking said slidable plate in said operative position after said slidable plate has been moved to said operative position by the application of said finger pressure thereto, said slidable plate locking means releasing said slidable plate from said operative position by the next succeeding application of the finger pressure thereto;
    means for disengaging said movable chassis locking means to release said movable chassis from sad operative position by the application of finger pressure irrespective of the position of said slidable plate locking means;
    a reel mount rotatably carried by said movable chassis and operatively coupled to said drive motor, said reel mount having a hub portion engageable into a take-up reel within said container for winding the magnetic tape therearound;
    said container, which has been inserted into the player, being removable when said movable chassis is moved from said operative position back to said inoperative position of said movable chassis, with said projection means pushing said container along said passage while sliding in a direction perpendicular to the plane of said container; and means for forcing said pinch roller carriage to said disengaged position with said pinch roller separating away from said capstan in response to movement of said slidable plate from said inoperative position towards said operative position.

2. A cassette-type magnetic tape player as claimed in claim 1, wherein said slidable plate locking means comprises a projection element rigidly carried by said movable chassis and extending at right angles to the plane of one of said stationary and movable chassis, said projection element having a tip portion adapted to project outwardly through the plane of said stationary chassis when said movable chassis is in said operative position, and a locking arm pivotally carried by said slidable plate for pivotal movement between locked and unlocked positions and normally biased to said locked position, sad locking arm being engageable with said tip portion of said projection element when the finger pressure is first applied to said slidable plate to move the latter to said operative position while said movable chassis is held in said operative position, thereby locking said slidable plate in said operative position, said locking arm being disengageable from said tip portion of said projection element when the finger pressure is again applied to said slidable plate while said slidable plate is held in said operative position with said movable chassis held in said operative position, thereby returning said slidable plate back to said inoperative position of said slidable plate.

3. A cassette-type magnetic tape player as claimed in claim 1, further comprising means built into said reel mount for automatically releasing said slidable plate, which has been held in said operative position, from said operative position to permit said slidable plate to return to said inoperative position of said slidable plate and for, simultaneously therewith, releasing said movable chassis, which has been locked in said operative position, from said operative position to permit said movable chassis to return to said inoperative position of said movable chassis, when a substantially full length of said magnetic tape has been wound onto the take-up reel within said container.

4. A cassette-type magnetic tape player as claimed in claim 2, further comprising means built into said reel mount for automatically releasing said slidable plate, which has been held in said operated position, from said operative position to permit said slidable plate to return to said inoperative position of said slidable plate and for, simultaneously therewith, releasing said movable chassis, which has been locked in said operative position, from said operative position to permit said movable chassis to return to said inoperative position of said movable chassis, when a substantially full length of said magnetic tape has been wound onto the take-up reel within said container.

5. An end-of-play detecting mechanism as claimed in claim 3 in which said means built into said reel mount comprises a take-up pulley rotatably mounted on said hub portion and coupled to said drive motor, said take-up pulley having an eccentric cam body thereon with an engagement recess therein with the cam body in offset relation to the axis of rotation of said pulley; slip clutch means coupled between said hub portion and said take-up pulley for driving said take-up support for tape winding; a biasing lever; detecting slip clutch means coupled to said take-up support for rotation by said take-up support and engaging said biasing lever for exerting a rotational biasing force on said biasing lever; blocking means for blocking movement of said slidable plate to said inoperative position, and a switching lever having one end adapted to be connected to said blocking means and having the other end with a projection thereon engagable in said engagement recess in said cam body, said biasing lever engaging said switching lever for biasing said switching lever for holding the projection out of engagement in said engagement recess as long as said detecting slip clutch means exerts a biasing force on said biasing lever, whereby when substantially a full length of tape has been wound on the take-up reel and the rotation of the rotation of the take-up support is interrupted, the biasing lever no longer has the biasing force exerted thereon and said engagement on said switching lever is engaged in said engagement recess and continued rotation of said take-up pulley pulls said switching lever for actuating the blocking means to unblock said slidable plate.

6. An end-of-play detecting mechanism as claimed in claim 5 in which one end of said switching lever is adapted to be pivotally connected to the blocking means and the other end of said lever is forked and one portion of said fork has said projection thereon and the other portion of said fork is engaged with said cam body for causing said switching lever to oscillate during rotation of said take-up support.

7. An end-of-play detecting mechanism which comprises a take-up support for a take-up reel for winding a magnetic tape fed from a supply reel, the take-up reel and the supply reel being operatively housed within a self-contained container, such as a cassette or cartridge, utilizable in a cassette-type magnetic tape player; a take-up pulley rotatably mounted on said take-up support, said take-up pulley having an eccentric cam body thereon with an engagement recess therein with the cam body in offset relation to the axis of rotation of said pulley; slip clutch means coupled between said take-up support and said take-up pulley for driving said take-up support for tape winding; a biasing lever; detecting slip clutch means coupled to said take-up support for rotation by said take-up support and engaging said biasing lever for exerting a rotational biasing force on said biasing lever; and a switching lever having one end adapted to be connected to a switching device for a tape player and having the other end with a projection thereon engagable in said engagement recess in said cam body, said biasing lever engaging said switching lever for biasing said switching lever for holding the projection out of engagement in said engagement recess as long as said detecting slip clutch means exerts a biasing force on said biasing lever, whereby when substantially a full length of tape has been wound on the take-up reel and the rotation of the rotation of the take-up support is interrupted, the biasing lever no longer has the biasing force exerted thereon and said engagement on said switching lever is engaged in said engagement recess and continued rotation of said take-up pulley pulls said switching lever for actuating the switching device.

8. An end-of-play detecting mechanism as claimed in claim 7 in which said one end of said switching lever is adapted to be pivotally connected to the switching device and the other end of said lever is forked and one portion of said fork has said projection thereon and the other portion of said fork is engaged with said cam body for causing said switching lever to oscillate during rotation of said take-up support.

9. An end-of-play detecting mechanism which comprises a take-up support for a take-up reel for winding a magnetic tape fed from a supply reel; a take-up pulley rotatably mounted on said take-up support, said take-up pulley having an eccentric cam body thereon with an engagement recess therein with the cam body in offset relation to the axis of rotation of said pulley; slip clutch means coupled between said take-up support and said take-up pulley for driving said take-up support for tape winding; a biasing lever; detecting slip clutch means coupled to said take-up support for rotation by said take-up support and engaging said biasing lever for exerting a rotational biasing force on said biasing lever; and a switching lever having one end adapted to be connected to a switching device for a tape player and having the other end with a projection thereon engagable in said engagement recess in said cam body, said biasing lever engaging said switching lever for biasing said switching lever for holding the projection out of engagement in said engagement recess as long as said detecting slip clutch means exerts a biasing force on said biasing lever, whereby when substantially a full length of tape has been wound on the take-up reel and the rotation of the rotation of the takeup support is interrupted, the biasing lever no longer has the biasing force exerted thereon and said engagement on said switching lever is engaged in said engagement recess and continued rotation of said take-up pulley pulls said switching lever for actuating the switching device.

* * * * *